(12) United States Patent
Henttonen et al.

(10) Patent No.: US 11,968,135 B2
(45) Date of Patent: Apr. 23, 2024

(54) CARRIER AGGREGATION

(71) Applicant: Nokia Technologies Oy, Espoo (FI)

(72) Inventors: Tero Henttonen, Espoo (FI); Elena Virtej, Espoo (FI); Lars Dalsgaard, Oulu (FI); Jarkko Koskela, Oulu (FI)

(73) Assignee: Nokia Technologies Oy, Espoo (FI)

(*) Notice: Subject to any disclaimer, the term of this patent is extended or adjusted under 35 U.S.C. 154(b) by 411 days.

(21) Appl. No.: 17/290,023

(22) PCT Filed: Nov. 13, 2018

(86) PCT No.: PCT/EP2018/081089
§ 371 (c)(1),
(2) Date: Apr. 29, 2021

(87) PCT Pub. No.: WO2020/098922
PCT Pub. Date: May 22, 2020

(65) Prior Publication Data
US 2021/0409171 A1  Dec. 30, 2021

(51) Int. Cl.
*H04L 5/00* (2006.01)
*H04W 74/00* (2009.01)
(Continued)

(52) U.S. Cl.
CPC .......... *H04L 5/0032* (2013.01); *H04L 5/0053* (2013.01); *H04L 5/0098* (2013.01);
(Continued)

(58) Field of Classification Search
CPC ... H04L 5/0032; H04L 5/0035; H04L 5/0053; H04L 5/0098; H04L 5/0048; H04L 5/001;
(Continued)

(56) References Cited

U.S. PATENT DOCUMENTS

2013/0010711 A1   1/2013  Larsson et al. ............... 370/329
2015/0319778 A1*  11/2015  Folke .................... H04W 48/20
                                                           370/330

(Continued)

OTHER PUBLICATIONS

3GPP TSG-RAN2 Meeting #99, Berlin, Germany, Aug. 21-25, 2017, R2-1707788, "Fast SCell Configuration and Activation Through network assisted RRC_Idle mode measurements", Qualcomm Incorporated, 5 pgs.

(Continued)

*Primary Examiner* — Mohamed A Kamara
(74) *Attorney, Agent, or Firm* — Barta Jones, PLLC

(57) ABSTRACT

According to an example aspect of the present invention, there is provided an apparatus including at least one processing core, at least one memory including computer program code, the at least one memory and the computer program code being configured to, with the at least one processing core, cause the apparatus at least to obtain an uplink transmission configuration including information on at least one secondary cell candidate frequency, transmit a signal in the uplink in accordance with the uplink transmission configuration on the at least one secondary cell candidate frequency, during a connection establishment procedure which transitions the apparatus from an idle mode to a connected mode, and receive a resource aggregation configuration from a network.

20 Claims, 6 Drawing Sheets

(51) Int. Cl.
*H04W 76/27* (2018.01)
*H04W 74/0833* (2024.01)

(52) U.S. Cl.
CPC ......... *H04W 74/006* (2013.01); *H04W 76/27* (2018.02); *H04W 74/0833* (2013.01)

(58) Field of Classification Search
CPC ............... H04W 74/006; H04W 76/27; H04W 74/0833; H04W 76/15; H04W 24/02; H04W 48/20
See application file for complete search history.

(56) References Cited

U.S. PATENT DOCUMENTS

| 2017/0359747 | A1 | 12/2017 | Lunden et al. | |
| 2021/0120623 | A1* | 4/2021 | Zheng | H04W 48/20 |
| 2021/0153058 | A1* | 5/2021 | Zheng | H04W 24/02 |

OTHER PUBLICATIONS

3GPP TSG-RAN WG2 Meeting #99, Berlin, Germany, Aug. 21-25, 2017, R2-1708547, "Down-selection of Idle Mode Measurement Report alternatives for fast SCell set-up", Huawei, HiSilicon, 5 pgs.
3GPP TSG-RAN2 Meeting #101, Athens, Greece, Feb. 26-Mar. 2, 2018, R2-1802073, "Fast SCell Configuration through Quick SCell Measurement Reporting", 8 pgs.

* cited by examiner

CARRIER AGGREGATION

CROSS REFERENCE TO RELATED APPLICATION

This patent application is a U.S. National Stage application of International Patent Application Number PCT/EP2018/081089 filed Nov. 13, 2018, which is hereby incorporated by reference in its entirety.

FIELD

The present disclosure relates to establishment of carrier aggregation connections.

BACKGROUND

In cellular or non-cellular wireless communication, carrier aggregation means combining two or more distinct carriers into one data channel to enhance data transmission capacity for the data channel. The carriers that are combined may be on a same frequency band or on different frequency bands. When on the same band, the carriers may be adjacent to each other in frequency, referred to as contiguous, or non-adjacent, which is referred to as non-contiguous. When the combined carriers are on the same frequency band, the carrier aggregation is intra-band carrier aggregation. On the other hand, when the combined carriers are on different frequency bands, the carrier aggregation is referred to as inter-band carrier aggregation.

SUMMARY OF THE INVENTION

According to some aspects, there is provided the subject-matter of the independent claims. Some embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to obtain an uplink transmission configuration comprising information on at least one secondary cell candidate frequency, transmit a signal in the uplink in accordance with the uplink transmission configuration on the at least one secondary cell candidate frequency, during a connection establishment procedure which transitions the apparatus from an idle mode to a connected mode, and receive a resource aggregation configuration from a network.

According to a second aspect of the present invention, there is provided a method comprising obtaining, in an apparatus, an uplink transmission configuration comprising information on at least one secondary cell candidate frequency, transmitting a signal in the uplink in accordance with the uplink transmission configuration on the at least one secondary cell candidate frequency, during a connection establishment procedure which transitions the apparatus from an idle mode to a connected mode, and receiving a resource aggregation configuration from a network.

According to a third aspect of the present invention, there is provided an apparatus comprising at least one processing core, at least one memory including computer program code, the at least one memory and the computer program code being configured to, with the at least one processing core, cause the apparatus at least to provide to a user equipment an uplink transmission configuration comprising information on at least one secondary cell candidate frequency, prepare, during a connection establishment procedure which transitions the user equipment from an idle mode to a connected mode, a resource aggregation configuration for the user equipment, based at least partly on information from candidate secondary cells which concerns a signal level at which the candidate secondary cells have received a signal transmitted in the uplink by the user equipment during the connection establishment procedure, and provide the resource aggregation configuration to the user equipment.

According to a fourth aspect of the present invention, there is provided a method comprising providing to a user equipment an uplink transmission configuration comprising information on at least one secondary cell candidate frequency, preparing, during a connection establishment procedure which transitions the user equipment from an idle mode to a connected mode, a resource aggregation configuration for the user equipment, based at least partly on information from candidate secondary cells which concerns a signal level at which the candidate secondary cells have received a signal transmitted in the uplink by the user equipment during the connection establishment procedure, and providing the resource aggregation configuration to the user equipment.

According to a fifth aspect of the present invention, there is provided an apparatus comprising means for obtaining, in the apparatus, an uplink transmission configuration comprising information on at least one secondary cell candidate frequency, means for transmitting a signal in the uplink in accordance with the uplink transmission configuration on the at least one secondary cell candidate frequency, during a connection establishment procedure which transitions the apparatus from an idle mode to a connected mode, and means for receiving a resource aggregation configuration from a network.

According to a sixth aspect of the present invention, there is provided an apparatus comprising means for providing to a user equipment an uplink transmission configuration comprising information on at least one secondary cell candidate frequency, means for preparing, during a connection establishment procedure which transitions the user equipment from an idle mode to a connected mode, a resource aggregation configuration for the user equipment, based at least partly on information from candidate secondary cells which concerns a signal level at which the candidate secondary cells have received a signal transmitted in the uplink by the user equipment during the connection establishment procedure, and means for providing the resource aggregation configuration to the user equipment.

According to a seventh aspect of the present invention, there is provided a non-transitory computer readable medium having stored thereon a set of computer readable instructions that, when executed by at least one processor, cause an apparatus to at least obtain, in the apparatus, an uplink transmission configuration comprising information on at least one secondary cell candidate frequency, transmit a signal in the uplink in accordance with the uplink transmission configuration on the at least one secondary cell candidate frequency, during a connection establishment procedure which transitions the apparatus from an idle mode to a connected mode, and receive a resource aggregation configuration from a network.

According to an eighth aspect of the present invention, there is provided a non-transitory computer readable medium having stored thereon a set of computer readable instructions that, when executed by at least one processor, cause an apparatus to at least provide to a user equipment an uplink transmission configuration comprising information on at least one secondary cell candidate frequency, prepare, during a connection establishment procedure which transitions the user equipment from an idle mode to a connected mode, a resource aggregation configuration for the user equipment, based at least partly on information from candidate secondary cells which concerns a signal level at which the candidate secondary cells have received a signal transmitted in the uplink by the user equipment during the connection establishment procedure, and provide the resource aggregation configuration to the user equipment.

According to a ninth aspect of the present invention, there is provided a computer program configured to cause an apparatus to perform at least the following, when run on a processor: obtain, in the apparatus, an uplink transmission configuration comprising information on at least one secondary cell candidate frequency, transmit a signal in the uplink in accordance with the uplink transmission configuration on the at least one secondary cell candidate frequency, during a connection establishment procedure which transitions the apparatus from an idle mode to a connected mode, and receive a resource aggregation configuration from a network.

According to a tenth aspect of the present invention, there is provided a computer program configured to cause an apparatus to perform at least the following, when run on a processor: provide to a user equipment an uplink transmission configuration comprising information on at least one secondary cell candidate frequency, prepare, during a connection establishment procedure which transitions the user equipment from an idle mode to a connected mode, a resource aggregation configuration for the user equipment, based at least partly on information from candidate secondary cells which concerns a signal level at which the candidate secondary cells have received a signal transmitted in the uplink by the user equipment during the connection establishment procedure, and provide the resource aggregation configuration to the user equipment.

EMBODIMENTS

In accordance with the present disclosure, an activation delay of carrier aggregation is reduced by conducting transmissions from a user equipment to potential secondary cells already during a connection establishment procedure of the user equipment, rather than waiting until the connection establishment procedure is complete. In other words, establishment of a connection to a primary cell and establishment of a carrier aggregation proceed simultaneously for a user equipment, resulting in an overall reduced delay in obtaining a functional carrier aggregation when starting from an idle or inactive mode. The transmissions from the user equipment may comprise at least one signal transmitted on at least one frequency of at least one candidate secondary cell. The candidate secondary cell frequencies may be on different frequency bands than a frequency band used in the connection establishment procedure, with a primary cell.

Figure 1:
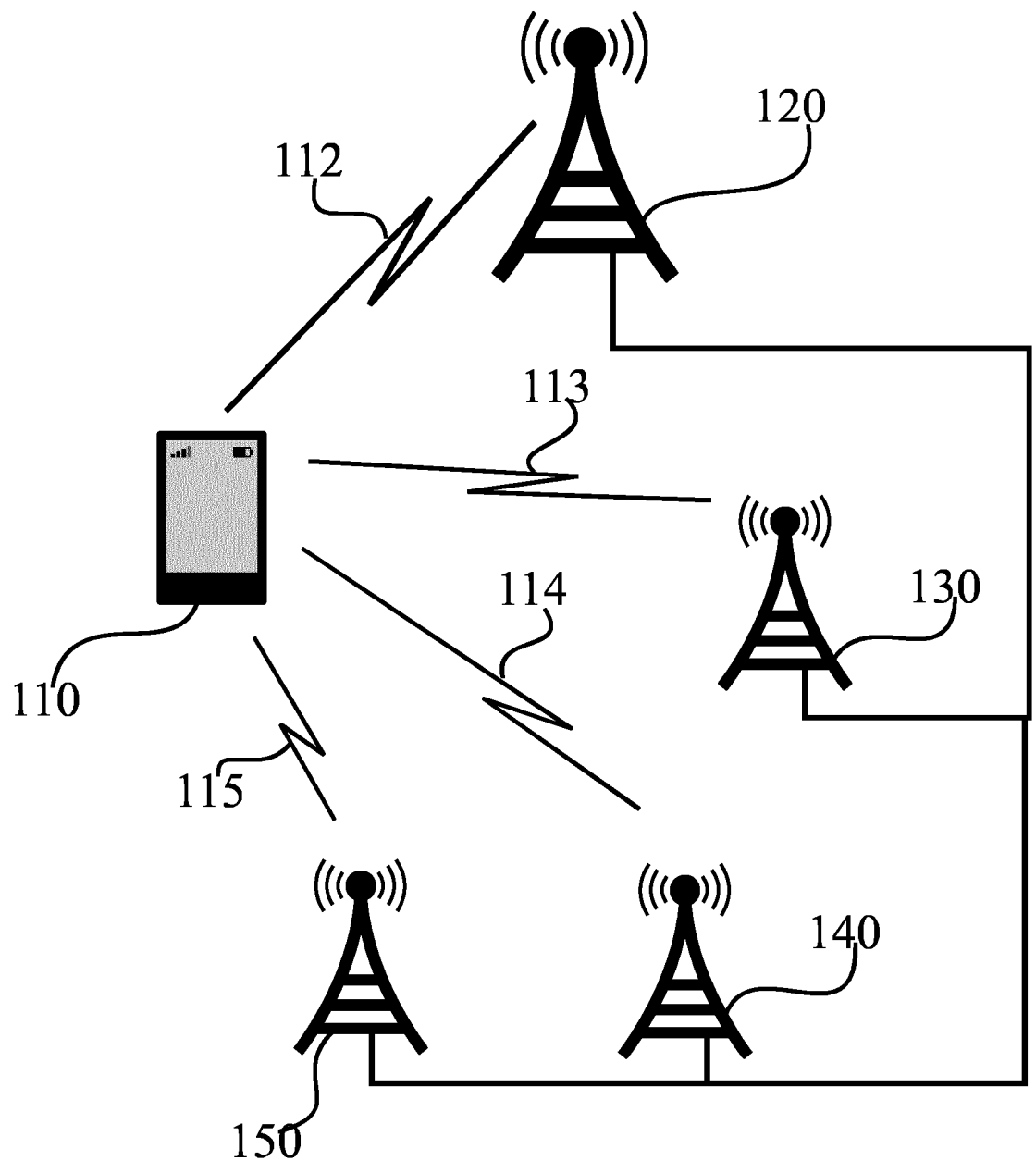
FIG. 1 illustrates an example system in accordance with at least some embodiments of the present invention.

FIG. 1 illustrates an example system in accordance with at least some embodiments of the present invention. The system comprises user equipment, UE, 110, which may comprise, for example, a smartphone, a mobile phone, a tablet computer, a laptop computer, a desktop computer, a machine-type communication node, an Internet of Things node, a sensor or a communication module for an automobile or aircraft.

UE 110 is in communication with base station 120. Base station 120 may comprise a base station of a cellular or non-cellular wireless communication system. For example, concerning cellular technologies, a base station configured to operate in accordance with long term evolution, LTE, may be referred to as an eNB, while a base station configured to operate in accordance with fifth generation, 5G, also known as New Radio, NR, may be referred to as a gNB. On the other hand, concerning non-cellular technologies, for example in worldwide interoperability for microwave access, WiMAX, or wireless local area network, WLAN, a base station may be referred to as an access node. WLAN may be alternatively known as 802.11 or Wi-Fi. The term "base station" is employed in the present disclosure as a terminological choice, with no limitation to either cellular or non-cellular technologies.

Base station 120 may be comprised in an overall communication system, which also comprises a core network. A core network is not illustrated in FIG. 1. Base station 120 is configured to control at least one cell, and in some embodiments, more than one cell. A carrier aggregation may be established using carriers of more than one cell, such that the cells may be controlled by one base station, or by plural base stations. FIG. 1 illustrates further base stations 130, 140 and 150, with which base station 120 is enabled to communicate. Such communication may take place over inter-base station links, such as the X2 interface, or via a core network or a base station controller node. The number of further base stations in FIG. 1 is merely illustrative and not limiting. Indeed, as carrier aggregation may be performed with carriers of cells controlled by one and the same base station, further base stations, such as further base stations 130, 140 and 150, overall are not indispensable for the functioning of the technology described herein. The set of base stations may be referred to, in general, as a radio access network. A cell where a primary carrier of a carrier aggregation is, is referred to as a primary cell, PCell. On the other hand, A cell where a secondary carrier of a carrier aggregation is, is referred to as a secondary cell, SCell. A carrier aggregation has a primary carrier and at least one secondary carrier.

UE 110 is able to communicate with base station 120 via wireless link 112. Wireless link 112 is arranged in accordance with a same radio access technology, RAT, as UE 110 and base station 120, to thereby obtain interoperability between these devices. Wireless link 112 may have an uplink for conveying information from UE 110 to base station 120, and a downlink for conveying information from base station 120 to UE 110.

UE 110 may be able to communicate with the further base stations as well, in detail, with further base station 130 via wireless link 113, with further base station 140 via wireless link 114 and/or with further base station 150 via wireless link 115. Wireless links 113, 114 and 115 may likewise comprise uplinks for conveying information from the UE side toward the base station side, and downlinks for conveying information from the base station side toward the UE side.

UE 110 may be in idle mode or connected mode with regard to the network. In a connected mode, UE 110 has a radio resource control, RRC, connection with the network and is enabled to communicate information. In the idle mode, on the other hand, the UE is camped in a cell of the network, but it does not have an active connection, such as an RRC connection, and transmitting data to the network requires first a connection establishment procedure to build up a RRC connection for communication. In idle mode, the network can page the UE, since the network will know the whereabouts of UE 110 in the network coverage area. In another example, UE 110 could be in inactive state, which means that RRC connection between base station(s) and UE 110 is suspended, but the control-plane, C-plane, and user-plane, U-plane, connections are kept alive, in other words, from a core network point of view, the UE is still active. In this inactive state, a UE context is stored in both UE 110 and a radio access network, RAN, for example NG-RAN. UE connection may then be established using the Suspend and Resume procedure, for example. In this state, a RAN-based notification area may be configured by RRC layer.

In order to transition from an idle or inactive mode to a connected mode with carrier aggregation, a UE such as UE 110 must transition to the connected mode and to participate in establishment of the carrier aggregation. Overall, this may take some time, for example 500 milliseconds, which is a delay which a user may detect. Furthermore, where UE 110 is a machine-type node, a 500-millisecond delay may be undesired. For example where a high-resolution video feed is to be provided, it may be more useful to obtain the video feed sooner from an event triggering its provision rather than later.

In another example, the present embodiments may apply not only to fast carrier aggregation activation, but also to speeding up other ways of aggregating resources from multiple cells, such as fast dual connectivity activation, multi-connectivity activation, new radio—new radio dual connectivity, NR-NR DC, activation, E-UTRA new radio dual connectivity, EN-DC, fast activation and alike. Carrier aggregation is used here as an example. Thus carrier aggregation, dual connectivity and multi-connectivity may be considered examples of resource aggregation. Multi-radio access technology dual connectivity may be referred to as MR-DC.

To reduce the delay in transitioning from the inactive or idle mode to connected mode with carrier aggregation, a few different approaches are possible. Firstly, an early measurement report may be transmitted. In this approach, a UE may report, during a connection establishment procedure, to the PCell, results of measurements it has conducted while in idle mode or inactive mode. Availability of such results may be indicated in a "msg5" message, for example, by which it is meant a radio resource connection, RRC, setup complete message. The PCell may then request the results to be provided after security activation. A potential problem with measurements conducted in idle mode or during inactive mode is that they may be partly or completely out of date by the time they're used. On the other hand, carrier aggregation may be configured blindly, without UE feedback. While fast, this procedure runs the risk of failure, as incorrect cells may be selected as secondary cells, SCells. Sounding reference signal, SRS, switching is possible in the LTE technology, which allows a UE to send SRS over SCells which normally have no uplink, for example if the UE supports only one UL in any band combination. However, this requires configuration of both carrier aggregation, CA, and SRS, and can therefore be used only after CA has been activated. The primary problem for every case is the same, namely, how to help the UE become setup with the correct SCells that enable CA in as fast manner as possible.

In accordance with technology described herein, UE 110 may transmit a signal in the uplink during a connection establishment procedure, that is, during the transitioning from idle or inactive mode to connected mode. Herein transmitting in the uplink means transmitting in the uplinks of potential wireless links to potential SCells. The network may allocate uplink resources to the UE, which the UE then uses to transmit the signal in at least one SCell candidate carrier frequency. The transmission is received by the candidate SCell(s) to determine an uplink signal quality. Additionally, the network may transmit channel state information—reference signal, CSI-RS, in the downlink direction which UE 110 may then measure and, optionally, send the results of this measurement in a measurement or channel state information report. The downlink transmission may take place more than once. It may take place also over the primary carrier. Based on this procedure, the network may determine which SCell(s), if any, to configure for the UE for carrier aggregation. In detail, SCells which have good signal quality towards the UE may be configured to participate in the carrier aggregation, since information may successfully be transmitted via them to and from the UE. The UL resources to transmit the signal may be activated based on broadcast or dedicated configuration and could be assigned already during a connection setup, implicitly or explicitly.

In some example embodiments, the UE may send SRS or SRS-like signal(s)) to the network, which in turn measures the SRS or SRS-like signal and decides based on that whether to configure SCell to that UE. In one example, the triggering of the SRS or SRS-like signal could be based on, for example, reception by UE of Msg2 (random access response) or reception of Msg4 (RRC connection setup message). In turn, the UE may transmit the SRS or SRS-like signal together with either Msg3 and/or Msg5, in case the transmission was triggered by reception of Msg2, or Msg5, in case the transmission was triggered by reception of Msg4 (RRC connection setup). The UE may be configured to send the SRS or SRS-like signal, for example, when transitioning to IDLE/INACTIVE or in, for example, Msg4.

In one example embodiment, additionally, the reception of SRS signal could trigger a base station to send, for example, CSI-RS (or CSI-RS like signals) that UE could measure and report. This could last for some time, and configuration may be given in, for example, RRCRelease or, for example, in Msg4 (RRC connection setup message).

The UE may be configured to obtain/receive an uplink transmission configuration comprising information on at least one secondary cell candidate frequency, to transmit a signal in the uplink in accordance with the uplink transmission configuration on the at least one secondary cell candidate frequency, during a connection establishment procedure which transitions the apparatus from an idle mode to a connected mode, and to receive a carrier aggregation configuration from a network. The uplink transmission configuration may be obtained during the connection establishment procedure, for example. The UE may be configured to transmit the signal in the uplink after receiving a random access response and before receiving a security activation message, the signal being other than a radio resource connection signalling message. The uplink transmission configuration may be obtained, by the UE, from at least one of the following: broadcast signalling, dedicated signalling and from determining the uplink transmission configuration from an identity of the apparatus.

The signal transmitted in the uplink may comprise, for example, at least one of the following: a sounding reference signal and a random access preamble. The UE may be configured to transmit the signal more than once. The number of times the UE transmits the signal may be selected in the UE in dependence of a type of traffic or type of application which requests the carrier aggregation. For example, a video telephony call may result in a larger number of times the signal is transmitted than a times system update. Increasing the number of times the signal is transmitted involves investing more energy in establishing the carrier aggregation early.

In another example, the uplink transmission is sent more than once according to an implicit (e.g. fixed) or explicit (i.e. configured) duration. In another example, when receiving at the UE a configuration for sending UL transmission according to a specific UL signal configuration given by the network, the UE may receive information for which cells UL transmission is allowed. The configuration may be received via broadcast or dedicated signalling, for example.

For example, the UE may be configured to obtain information identifying which cells allow transmission of the signal in the uplink during the connection establishment procedure. The UE may be configured to obtain, from broadcasted system information or in connection with a state transition from the connected mode to the idle or inactive mode, an indication that the signal is to be transmitted during the connection establishment procedure at least one of: responsive to receiving a Msg2 (e.g. random access response message), responsive to receiving a Msg4 (e.g. RRC connection setup message), in connection with transmitting at least one of Msg3 (e.g. RRC connection request message) and in connection with transmitting Msg5 (e.g. RRC connection setup complete message). The UE may be configured to receive at least one downlink signal after transmitting the signal in the uplink, and to report to the network a received signal strength of the at least one downlink signal, as measured by the UE.

In an example embodiment, the network indicates, for example via per-cell broadcast information or via a pre-configured cell list in dedicated signalling, whether the UE is allowed to utilize the uplink configuration in a given cell. For example, UE 110 may know before sending the signal whether it is allowed to trigger the uplink transmission).

In another embodiment, the network sends a downlink signal to the UE after receiving the triggered UL signal transmission from the UE on a given carrier. The downlink signal may comprise, for example, at least of one of: CSI-RS signal, tracking reference signal, TRS, discovery reference signal, DRS, and a synchronization signal block, SSB, transmission. The downlink signal may be sent, for example: via the same carrier where the UL signal was sent, via the primary carrier and more than once according to implicit (e.g. fixed) or explicit (i.e. configured) duration.

Figure 2:
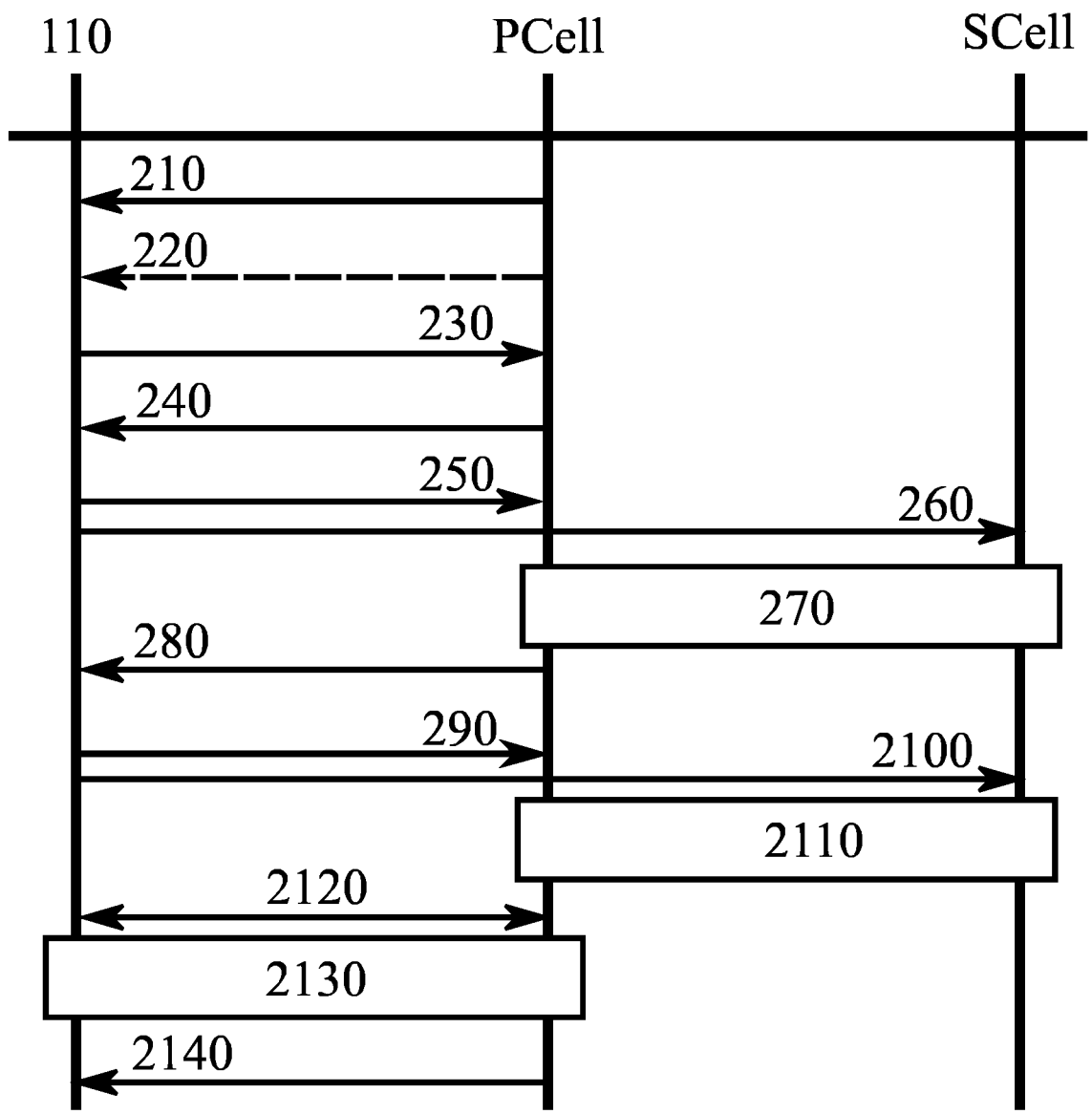
FIG. 2 illustrates an example process in accordance with at least some embodiments of the present invention.

FIG. 2 illustrates an example process in accordance with at least some embodiments of the present invention. On the vertical axes are disposed, from the left to the right, UE 110, primary cell PCell, and secondary cell(s) SCell. The PCell and SCell may be controlled by the same base station, or by different base stations. The SCell(s) may operate on a different frequency band than the PCell.

In phase 210, the UE is informed that uplink transmissions to SCell(s) are allowed during a connection establishment procedure. This informing may take place over broadcasted information, for example broadcasted system information, for example. Traffic with UE 110 may be mobile originated or mobile terminated. For example, in optional phase 220, UE 110 is paged to receive mobile terminated traffic). Where phase 220 is absent, UE 110 may itself determine it needs a connection with carrier aggregation. In phase 230, UE 110 initiates the connection establishment procedure by transmitting a random access preamble. Phase 230 may be referred to as Msg1, corresponding to transmitting the random access preamble. The PCell responds to phase 230 by transmitting, in phase 240, a random access response, which may comprise a grant of uplink resources. The message of phase 240 may be referred to as Msg2. The message of phase 240 may comprise an implicit or explicit trigger for the UE to transmit a signal in the uplink on at least one secondary cell candidate frequency. The UE may be informed concerning the at least one secondary cell candidate frequency in the message of phase 240, for example, or in phase 210. Therefore, in phase 240, PCell may indicate to UE 110 that it may initiate the uplink signal towards candidate SCell(s).

In phase 250, UE 110 transmits a radio resource control, RRC, setup request to the PCell, and, in embodiments where the message of phase 240 acts as the implicit or explicit trigger for the UE to transmit a signal in the uplink on the at least one secondary cell candidate frequency, UE 110 transmits this signal at phase 260. Phases 250 and 260 may occur in either order. Where phase 260 takes place more than once, it may take place both before and after phase 250. The message of phase 250 may be referred to as Msg3.

Where phase 260 takes place, the signal transmitted in the uplink in phase 260 is received by at least one SCell, and the SCell(s) and PCell may communicate to establish received signal strengths in the SCell(s) to help determine, which SCell(s) to include in the carrier aggregation. This takes place in phase 270.

In phase 280, the PCell issues a RRC setup message to the UE. This may be known as, for example, Msg4, and the UE responds, in phase 290, with RRC setup complete. The message of phase 280 may comprise an implicit or explicit trigger for the UE to transmit a signal in the uplink on at least one secondary cell candidate frequency. In embodiments where this is the case, the UE may transmit the uplink signal in phase 2100, and it may be received in phase 2110, as described above in connection with phases 260 and 270. In other words, UE 110 may transmit the signal in the uplink direction after either phase 240 or phase 280, depending on the embodiment. In some embodiments, the UE sends the uplink signal after both phases 240 and 280. The message of phase 290 may be referred to as, for example, Msg5, RRC setup complete.

Phase 2120 comprises security activation. In some embodiments, this phase also comprises data radio bearer/signalling radio bearer configuration. Data may be transmitted in ciphered form in phase 2130, and in phase 2140 the UE is configured for the carrier aggregation, such that the inclusion of at least one SCell into the carrier aggregation is determined based on processing the received signal strength of the uplink signal in phase 270 and/or 2110, as described herein above.

Figure 3:
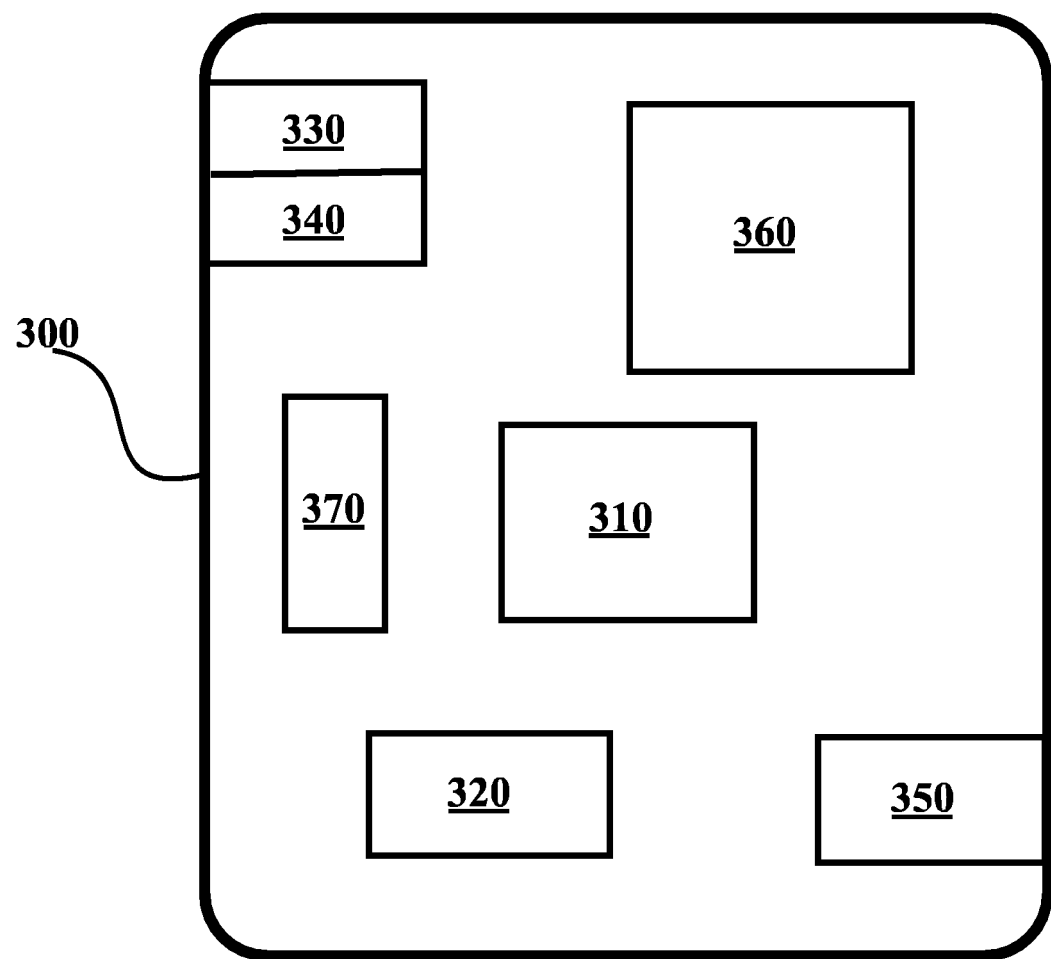
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as UE 110 of FIG. 1, or, in applicable parts, base station 120. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core designed by ARM Holdings or a Zen processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
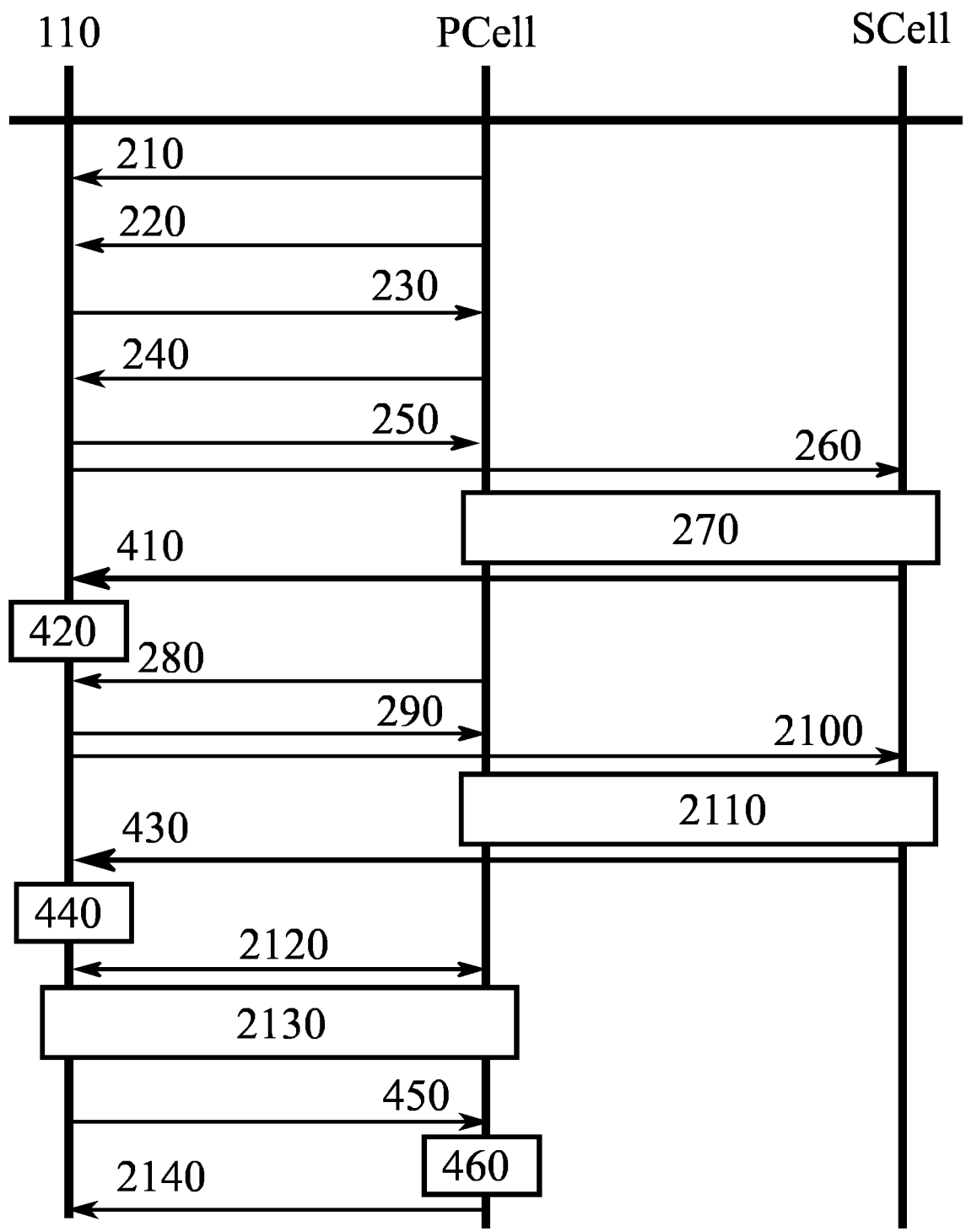
FIG. 4 illustrates an example process in accordance with at least some embodiments of the present invention.

FIG. 4 illustrates an example process in accordance with at least some embodiments of the present invention. The process of FIG. 4 resembles that of FIG. 2, and indeed like numbering relates to like phases as in FIG. 2. FIG. 4 illustrates an example of a process, where the candidate SCell(s) transmit signals in the downlink direction to determine received signal qualities also in the UE. This facilitates selection of SCells for the carrier aggregation, since radio channel conditions are known in both directions, and not only in the uplink.

The following differences exist in FIG. 4 with respect to FIG. 2. Phase 410 and 420, and/or phase 430 and 440, comprise the SCell candidate(s) transmitting in the downlink and the UE 110 measuring a signal strength of this downlink transmission, respectively, as illustrated. Further, in phase 450 the UE informs the PCell of the received signal strength(s), and the PCell takes this information into account, phase 460, when deciding on an SCell configuration for the carrier aggregation. The informing of phase 450 need not take place at exactly the place in the sequence as illustrated in FIG. 4, rather, it may take place in general after phase 420 or 440, whichever is present in the respective embodiment.

Figure 5:
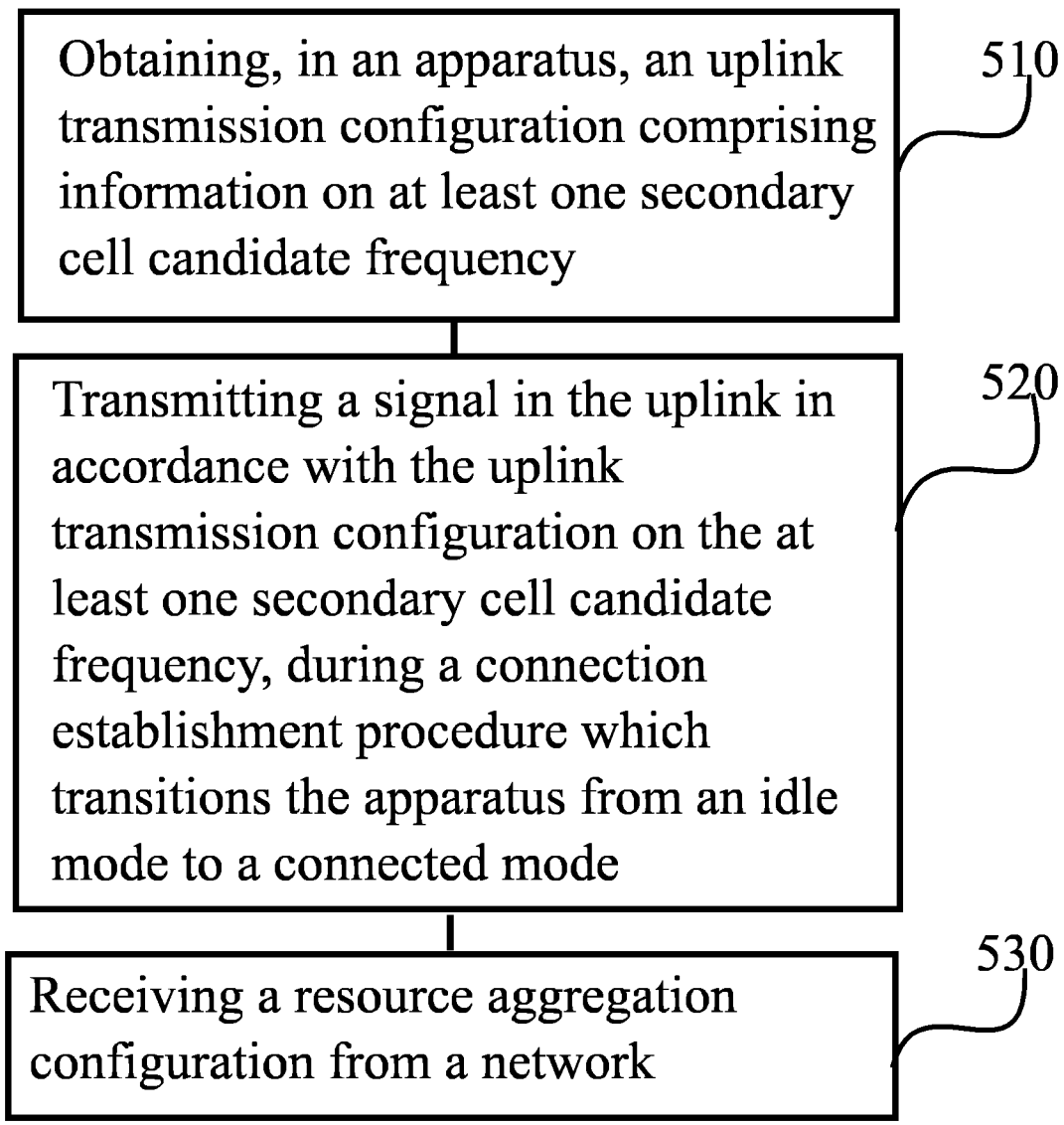
FIG. 5 is a flow graph of a method in accordance with at least some embodiments of the present invention.

FIG. 5 is a flow graph of a method in accordance with at least some embodiments of the present invention. The phases of the illustrated method may be performed in UE 110, an auxiliary device or a personal computer, for example, or in a control device configured to control the functioning thereof, when installed therein.

Phase 510 comprises obtaining, in an apparatus, an uplink transmission configuration comprising information on at least one secondary cell candidate frequency. Phase 520 comprises transmitting a signal in the uplink in accordance with the uplink transmission configuration on the at least one secondary cell candidate frequency, during a connection establishment procedure which transitions the apparatus from an idle mode to a connected mode. Finally, phase 530 comprises receiving a resource aggregation configuration from a network.

Figure 6:
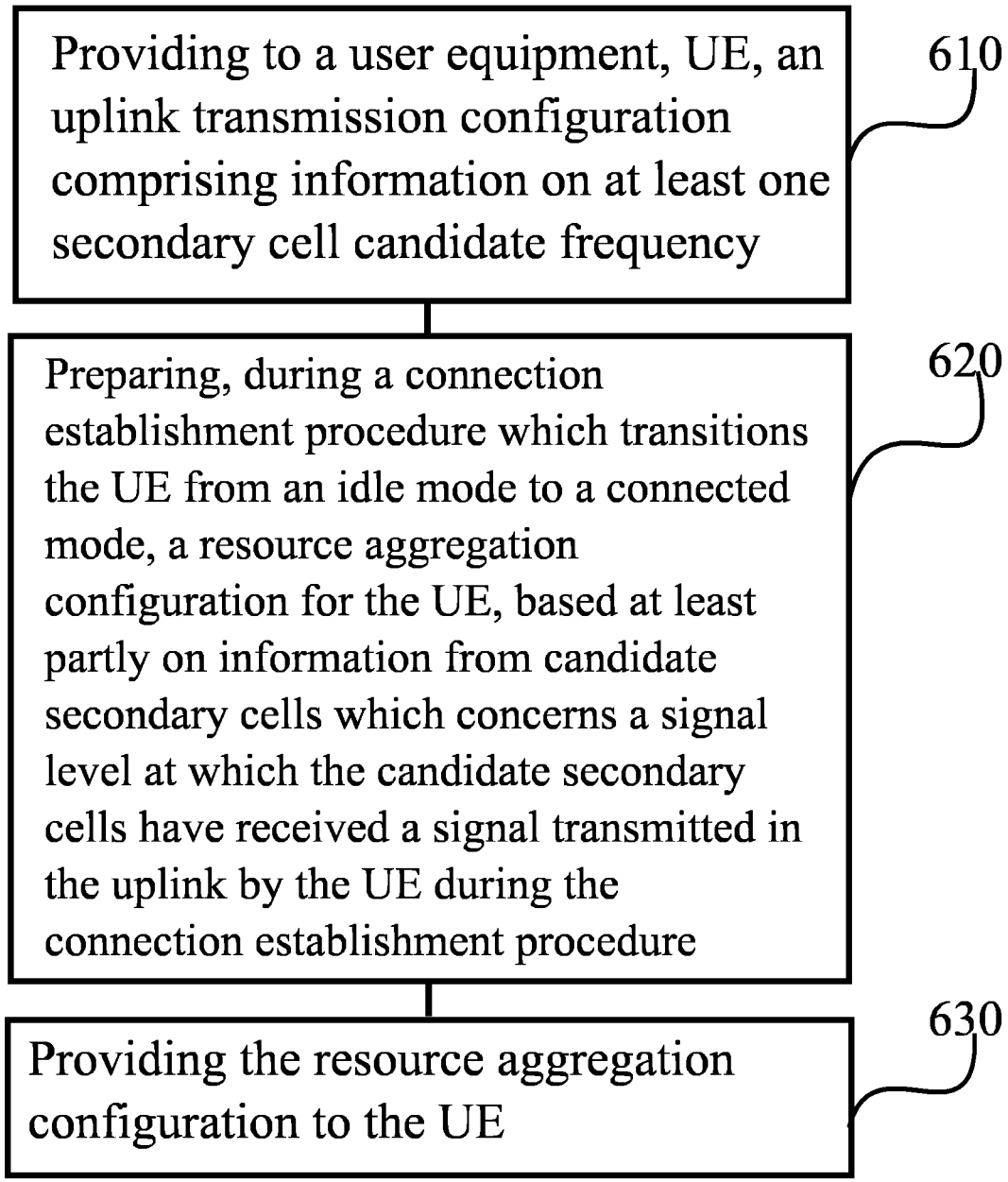
FIG. 6 is a flow graph of a method in accordance with at least some embodiments of the present invention.

FIG. 6 is a flow graph of a method in accordance with at least some embodiments of the present invention. The phases of the illustrated method may be performed in base station 120, an auxiliary device or a personal computer, for example, or in a control device configured to control the functioning thereof, when installed therein.

Phase 610 comprises providing to a user equipment an uplink transmission configuration comprising information on at least one secondary cell candidate frequency. Phase 620 comprises preparing, during a connection establishment procedure which transitions the user equipment from an idle mode to a connected mode, a resource aggregation configuration for the user equipment, based at least partly on information from candidate secondary cells which concerns a signal level at which the candidate secondary cells have received a signal transmitted in the uplink by the user equipment during the connection establishment procedure. Finally, phase 630 comprises providing the resource aggregation configuration to the user equipment.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in in wireless communications.

| REFERENCE SIGNS LIST | |
|---|---|
| 110 | User equipment, UE |
| 120 | Base station |
| 130, 140, 150 | Further base station |
| 112, 113, 114, 115 | Wireless links |
| 210-2140 | Phases of the process of FIG. 2 |
| 300-370 | Structure of the device of FIG. 3 |
| 410-460 | Phases of the process of FIG. 4 |
| 510-530 | Phases of the process of FIG. 5 |
| 610-630 | Phases of the process of FIG. 6 |

The invention claimed is:

1. An apparatus comprising:
   at least one processing core, and
   at least one non-transitory memory including computer program code, the at least one memory and the computer program code being configured to, with the at least one processing core, cause the apparatus at least to:
   receive an indication that uplink transmissions to secondary cells are allowed during a connection establishment procedure;
   determine that a connection with carrier aggregation is needed;
   initiate the connection establishment procedure by transmitting a random access preamble to a primary cell;
   receive, from the primary cell in response to the random access preamble, a random access response comprising a grant of uplink resources;
   obtain an uplink transmission configuration comprising information on a secondary cell candidate frequency from the random access response;
   transmit a signal in the uplink in the secondary cell candidate frequency to a secondary cell;
   as a result of the random access response, transmit a signal in the uplink in accordance with the uplink transmission configuration on the secondary cell candidate frequency to a secondary cell, during a connection establishment procedure which transitions the apparatus from an idle mode to a connected mode such that the primary cell and the secondary cell establish the signal strength of the uplink signal to determine secondary cell configuration for the carrier aggregation; and
   based on the signal strength, receive a carrier aggregation configuration from a network.

2. The apparatus according to claim 1, wherein the apparatus is configured to transmit the signal in the uplink after receiving the random access response and before receiving a security activation message, the signal being other than a radio resource connection signalling message.

3. The apparatus according to claim 2, wherein the apparatus is configured to obtain the uplink transmission configuration from at least one of the following:
   broadcast signalling, or
   from determining the uplink transmission configuration from an identity of the apparatus.

4. The apparatus according to claim 2, wherein the signal comprises a sounding reference signal and the random access preamble.

5. The apparatus according to claim 4, wherein the apparatus is configured to transmit the signal more than once.

6. The apparatus according to claim 5, wherein the apparatus is configured to obtain information identifying which cells allow transmission of the signal in the uplink during the connection establishment procedure.

7. The apparatus according to claim 1, wherein the apparatus is configured to obtain, in connection with a state transition from the connected mode to the idle or inactive mode, an indication that the signal is to be transmitted during the connection establishment procedure at least one of:
   responsive to receiving a Msg2,
   responsive to receiving a Msg4,
   in connection with transmitting Msg3, or
   connection with transmitting Msg5.

8. The apparatus according to claim 6, wherein the apparatus is configured to:
   receive at least one downlink signal after transmitting the signal in the uplink, and to report to the network a received signal strength, measured with the apparatus, of the at least one downlink signal; and
   based on the signal strength of the at least one downlink signal and the signal strength of the uplink signal, determining the secondary cell configuration for the carrier aggregation.

9. A method comprising:
   receiving an indication that uplink transmissions to secondary cells are allowed during a connection establishment procedure;
   determining that a connection with carrier aggregation is needed;
   initiating the connection establishment procedure by transmitting a random access preamble to a primary cell;
   receiving, from the primary cell in response to the random access preamble, a random access response comprising a grant of uplink resources;
   obtaining, with an apparatus, an uplink transmission configuration comprising information on at least one secondary cell candidate frequency from the random access response;
   transmitting a signal in the uplink in the secondary cell candidate frequency to a secondary cell;
   as a result of the random access response, transmitting a signal in the uplink in accordance with the uplink transmission configuration on the secondary cell candidate frequency to a secondary cell, during a connection establishment procedure which transitions the apparatus from an idle mode to a connected mode such that the primary cell and the secondary cell establish the signal strength of the uplink signal to determine secondary cell configuration for the carrier aggregation; and
   based on the signal strength, receiving a carrier aggregation configuration from a network.

10. The method according to claim 9, wherein the signal is transmitted in the uplink after receiving the random access response and before receiving a security activation message, the signal being other than a radio resource connection signalling message.

11. The method according to claim 9, wherein the uplink transmission configuration is obtained:

from determining the uplink transmission configuration from an identity of the apparatus.

12. The method according to claim 11, wherein the signal comprises a sounding reference signal and the random access preamble.

13. The method according to claim 12, further comprising transmitting the signal more than once.

14. The method according to claim 13, further comprising obtaining information identifying which cells allow transmission of the signal in the uplink during the connection establishment procedure.

15. The method according to claim 9, comprising obtaining, in connection with a state transition from the connected mode to the idle or inactive mode, an indication that the signal is to be transmitted during the connection establishment procedure at least one of:
responsive to receiving a Msg2,
responsive to receiving a Msg4,
in connection with transmitting Msg3, or
connection with transmitting Msg5.

16. The method according to claim 9, further comprising:
receiving at least one downlink signal after transmitting the signal in the uplink, and reporting to the network a received signal strength, measured with the apparatus, of the at least one downlink signal; and
based on the signal strength of the at least one downlink signal and the signal strength of the uplink signal, determining the secondary cell configuration for the carrier aggregation.

17. A non-transitory computer readable medium comprising computer-executable instructions that, when executed by one or more processors, cause the one or more processors to perform the following operations:
receiving an indication that uplink transmissions to secondary cells are allowed during a connection establishment procedure;
determining that a connection with carrier aggregation is needed;
initiating the connection establishment procedure by transmitting a random access preamble to a primary cell;
receiving, from the primary cell in response to the random access preamble, a random access response comprising a grant of uplink resources;
obtaining an uplink transmission configuration comprising information on a secondary cell candidate frequency from the random access response;
transmitting a signal in the uplink in the secondary cell candidate frequency to a secondary cell; as a result of the random access response, transmitting a signal in the uplink in accordance with the uplink transmission configuration on the secondary cell candidate frequency to a secondary cell, during a connection establishment procedure which transitions an apparatus from an idle mode to a connected mode such that the primary cell and the secondary cell establish the signal strength of the uplink signal to determine secondary cell configuration for the carrier aggregation; and
based on the signal strength, receiving a carrier aggregation configuration from a network.

18. The non-transitory computer readable medium according to claim 17, wherein the computer-executable instructions further cause the one or more processors to perform the following operations:
receiving at least one downlink signal after transmitting the signal in the uplink, and reporting to the network a received signal strength, measured with the apparatus, of the at least one downlink signal; and
based on the signal strength of the at least one downlink signal and the signal strength of the uplink signal, determining the secondary cell configuration for the carrier aggregation.

19. The non-transitory computer readable medium according to claim 18, wherein the signal is transmitted in the uplink after receiving the random access response and before receiving a security activation message, the signal being other than a radio resource connection signalling message.

20. The non-transitory computer readable medium according to claim 19, wherein the uplink transmission configuration is from determining the uplink transmission configuration from an identity of the apparatus.

* * * * *